United States Patent [19]
Boehmke

[11] Patent Number: 4,839,461
[45] Date of Patent: Jun. 13, 1989

[54] POLYASPARTIC ACID FROM MALEIC ACID AND AMMONIA

[75] Inventor: Günther Boehmke, Leverkusen, Fed. Rep. of Germany

[73] Assignee: Bayer Aktiengesellschaft, Leverkusen, Fed. Rep. of Germany

[21] Appl. No.: 80,844

[22] Filed: Aug. 3, 1987

[30] Foreign Application Priority Data

Aug. 7, 1986 [DE] Fed. Rep. of Germany ....... 3626672

[51] Int. Cl.$^4$ .................................................. C08G 69/00
[52] U.S. Cl. .................................... 528/363; 71/27; 71/85; 71/118; 252/80; 252/175; 525/419; 525/420; 525/539; 528/328
[58] Field of Search ............... 528/328, 363; 525/419, 525/420, 539; 71/118, 27, 85

[56] References Cited

U.S. PATENT DOCUMENTS 3,052,655  9/1962  Fox et al. ............................. 528/328
3,474,083 10/1969  Shiga et al. .......................... 528/328
4,385,169  5/1983  Kato et al. ........................... 528/328

Primary Examiner—Harold D. Anderson
Attorney, Agent, or Firm—Sprung Horn Kramer & Woods

[57] ABSTRACT

Polyaspartic acid and its salts, which can be obtained by reacting maleic acid and ammonia in a molar ratio of 1:1–1.5 at 120°–150° C. and , if appropriate, converting the acid into salts, are used for removing and preventing incrustations formed by the hardness constituents of water, or as a fertilizer.

2 Claims, No Drawings

POLYASPARTIC ACID FROM MALEIC ACID AND AMMONIA

The invention relates to polyaspartic acid and its salts, a process for their preparation and their use.

Polyaspartic acid and its salts are characterized in that they can be obtained by reacting maleic acid and ammonia in a molar ratio of 1:1–1.5 at 120°–150° C. and, if appropriate, converting the acid into salts.

The reaction is carried out by heating maleic acid or maleic anhydride, which changes into maleic acid while being heated with water, and ammonia to give a dry melt of the monoammonium to bisammonium salts which, if the temperature is raised, is converted at 120°–150° C., in particular 125°–140° C., into polyaspartic acid according to the invention.

It is preferable to raise the temperature to 125°–135° C. in the course of 4–6 hours and to keep it at this level for 0–2 hours.

As the condensation proceeds, the melt becomes viscous to solid. Elimination of $CO_2$, which expands the melt, begins at temperatures above 140°–160° C.

This loose mass can be broken up without further treatment to give a granular mass in suitable equipment, for example in Venuleth equipment having rotating scrapers, heatable screw conveyors, rotary kiln inclined at an angle and spraying equipment in which the air intake can be heated above 140° C.

Condensation reaction is assisted if a vacuum is applied towards the end of the reaction. An advantageous effect is also produced if the very porous solid product is comminuted, so that the heat transfer is adequate and the water of condensation can be removed.

A particularly advantageous procedure is to obtain the melt by controlling the temperature in a manner suited to the progress of the reaction. If, after removing the water of solution by evaporation, if necessary in vacuo, the salt is melted under normal pressure at 110°–115° C., and care is taken by passing an inert gas, for example nitrogen or carbon dioxide, over the material to ensure good distillation of the water of condensation, the temperature being raised to 128°–132° C., it is possible to carry out the condensation reaction in a melt capable of being stirred.

When water distils off in the first stage of the reaction, part of the ammonia also distils with it. The amount of ammonia is therefore made such that at least one of the carboxyl groups in the maleic acid is converted into the ammonium salt.

The acids according to the invention are obtained in a yield of 90–96% of theory. This can be increased further if the sublimed acid ammonium salts or maleic anhydride sublimate is recycled to subsequent batches.

The salts according to the invention are prepared by introducing, in the most advantageous case, an aqueous solution or suspension of metal hydroxides or ammonium hydroxides into the melt after the condensation reaction described above and after cooling to 100°–120° C. It is possible to prepare, in a short time, aqueous solutions of the salts of polyaspartic acid, for example 30–60% strength by weight solutions of Na, K. Li, Mg, Ca, ammonium, alkylammonium, hydroxyalkylammonium, Zn and Fe salts.

Free polyaspartic acid can, after being isolated, powdered and dried, also be mixed in equimolar amounts with the carbonates or pulverulent hydroxides of the metal ions. Neutralization is carried out when the mixture is dissolved in water.

The products according to the invention can be converted into d,L-aspartic acid by treatment with acid, for example treatment with hydrochloric acid.

450–500 mg of KOH are required to neutralize 1 g of the polyaspartic acids according to the invention. 487 mg of KOH/g are required by a polycondensation product in which one carboxyl group (relative to the number of carboxyl groups in the maleic acid employed) has been transferred completely into the polyamide chain and in which the other carboxyl group is present in the acid form.

Determination of molecular weight by analysis by gel chromatography gives molecular weights from 1000 to 4000 with a cluster at 1800 to 2000 - compared with a polyethylene glycol standard. This corresponds to 15–20 units of aspartic acid in the molecule of the compounds according to the invention.

Polyaspartic acid exhibits a strong band in the IR spectrum at $6.1\mu$ for the amide group, this being supplemented by a further band at $5.8\mu$ for the acid group.

Owing to its relatively good solubility in water, the free acid can be employed in industry and in the home for removing incrustations caused by the hardness constituents of water, because the salts are readily soluble and the risk encountered with strong acids is absent.

It is also possible to prevent the tarnishing of glass and porcelain articles in automatic dishwashing machines and to avoid polluting the effluent with phosphates or phosphonates.

The K, Mg and Ca salts according to the invention are suitable for use as fertilizers.

Condensation products of aspartic acid are known. E. Schaal (A. 157, page 24 [1871]) states that, if aspartic acid hydrochloride is heated to 180° C. and the residue treated with water, the residue is a condensation product insoluble in water, to which he assigned a 4-fold to 8-fold degree of condensation. According to I. Kovacs et al. (J. Org. Chem., 26, page 1084 [1961]), a polyacid or a polyamide of aspartic acid is formed from aspartic acid by heating the latter to 200° C. in vacuo in the course of 120 hours or in boiling tetralin in the course of 100 hours. A further route is demonstrated by M. Frankel and A. Berger (J. Org. Chem., 16, page 1513 [1951]). The benzyl ester of N-carboxyanhydroaspartic acid is converted into a polyamidobenzyl ester by heating. When saponified, the peptide linkage remains unchanged and the ester grouping is saponified with the formation of a polyamide-acid.

According to M. Dessaignes (Comp. rend. 31, page 433 [1850]), condensation products which produce aspartic acid when treated with nitric or hydrochloric acid are formed in the dry distillation of the acid ammonium salts of malic, fumaric or maleic acid at 200° C.

The process, according to the invention, for the preparation of polyaspartic acid constitutes a technically simple process which results in the end product using readily accessible starting materials, a low energy requirement and little effluent.

EXAMPLE 1

98 g of maleic anhydride and 50 g of water are heated with stirring in a stirred flask. An increase in temperature to approx. 75° C. takes place, with the melting of the anhydride, at 50°–55° C. This mixture is kept at these temperatures for about 30 minutes and 1 mol of ammonia solution (=68 g of 25% strength material) is then added at such a rate that no ammonia is lost through gas evolution. The resulting solution of the acid ammonium salt of maleic acid is evaporated to dryness in vacuo. The mash of crystals obtained is heated further without a vacuum until it melts. In the course of this the water of crystallization and even water of condensation distil off at temperatures of 110°–120° C. A vacuum is applied slowly after approximately 1 hour, and the temperature of the melt is raised to 130°–135° C. When the mass begins to become viscous the stirrer must be removed from the melt. The temperature is maintained for 4 hours with full vacuum. The mass is porous and can be crushed into a powder easily.

The yield is 108 g. A few grams of sublimate are deposited in the upper section and in the condenser, and it has been possible to employ these for a subsequent batch. When titrated, 478 mg of KOH are required to neutralize 1 g of product.

10 g of the product dissolve in 100 g of water, if partial neutralization is carried out with 2 g of sodium hydroxide solution or if 10 g are heated in 100 g of water.

The theoretical nitrogen content at an equivalent weight of 115 is 12.17%; 12.01% was found.

EXAMPLE 2

The quantities employed indicated in Example 1 are repeated, but the solution of the acid ammonium salt is evaporated with no vacuum. The suspension of crystals which changes into a melt above 115° C. is heated slowly to 128°–132° C. in the course of 5 hours while an inert gas (nitrogen or carbon dioxide) is passed over it.

The degree of condensation is indicated by the amount of water removed by distillation and the increase in the viscosity of the melt. After 5 hours, the consumption of KOH by a sample of 1 g is found by measurement to be 490 mg.

The melt, which has a slightly reddish colour, solidifies to a glass, and, as a result of its brittleness, can be comminuted readily.

It is advantageous to prepare the sodium salt by adding the sodium hydroxide solution after the completion of the reaction, when the melt has been cooled to 120° C. 28 g of water and 80 g of 45% strength sodium hydroxide solution are required to prepare a 50% strength by weight aqueous solution.

53 g of monoethanolamine and 55 g of water are employed to prepare the monoethanolamine salt.

The ammonium salt can only be prepared from the cooled mixture and a solution of ammonia, since a great deal of ammonia would escape under hot conditions.

EXAMPLE 3

19.6 kg of maleic anhydride and 19.6 kg of water are introduced into a paddle dryer. The mixture is heated at 90°–95° C. for one hour in order to cleave the anhydride. 14 kg of 25% strength ammonia solution are injected in order to form the acid ammonium salt. After the pressure has been released, the water of solution is removed by distilling up to 115° C., and the temperature is increased in the course of 5 hours to an internal temperature of 126°–128° C. In the course of this the water of condensation distils off.

Application of a vacuum causes the glassy melt to foam up, and it is broken up into a powder by the mechanical action of the paddle dryer.

From this product too, it is also possible to prepare, by mixing with alkali metal carbonates or alkaline earth metal hydroxides or carbonates, a pulverulent mass which forms the corresponding, readily water-soluble salts when it is dissolved in water.

EXAMPLE 4

98 g of maleic anhydride and 50 g of water are heated with stirring in a stirred flask. An increase in temperature to approximately 75° C. takes place, with melting of the anhydride, at 50°–55° C. The mixture is kept at these temperatures for about 30 minutes and 2 mol of ammonia solution (=136 g of 25% strength material) are then added at such a rate that no ammonia is lost through gas evolution. The resulting solution of the neutral ammonium salt is heated to 128°–132° C. as in Example 1 while an inert gas is passed over it.

Approximately 0.6 mol of ammonia escape with the water which has been distilled off. After 5 hours a sample is taken from the viscous melt. 1 g of this requires about 196 mg of KOH for neutralization. Before solidifying at 120°–110° C., the melt can also be taken up in 170 g of water to form a 40% strength solution.

The solution has an acid reaction, pH 3, and is suitable for the removal of lime deposits.

The solution can, however, also be neutralized with the bases mentioned, and mixed salts of polyaspartic acid are then obtained.

I claim:

1. A process for the preparation of a salt of polyaspartic acid comprising reacting maleic acid and ammonia in a molar ratio of 1:1–1.5 at 120°–140° C., and converting the resultant acid into a salt by adding a metal hydroxide or ammonium hydroxide to the acid.

2. A process for the preparation of a salt of polyaspartic acid according to claim 1, wherein maleic acid and ammonia are heated to a temperature of 125°–135° C. in the course of 4–6 hours and are maintained at this temperature for up to 2 hours, and, after cooling to 100°–120° C., an aqueous solution or suspension of a metal hydroxide or ammonium hydroxide is added.

* * * * *